(12) United States Patent
Nagai et al.

(10) Patent No.: US 12,091,146 B2
(45) Date of Patent: Sep. 17, 2024

(54) OUTBOARD MOTOR AND MARINE VESSEL

(71) Applicant: YAMAHA HATSUDOKI KABUSHIKI KAISHA, Iwata (JP)

(72) Inventors: Daijyu Nagai, Shizuoka (JP); Sadao Ojika, Shizuoka (JP); Masaki Urano, Shizuoka (JP); Tomohisa Matsumoto, Shizuoka (JP); Tomohiro Hagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 416 days.

(21) Appl. No.: 17/526,063

(22) Filed: Nov. 15, 2021

(65) Prior Publication Data
US 2022/0194541 A1 Jun. 23, 2022

(30) Foreign Application Priority Data
Dec. 21, 2020 (JP) .................. 2020-211783

(51) Int. Cl.
*B63H 20/32* (2006.01)
*B63H 20/02* (2006.01)
*F16B 9/02* (2006.01)

(52) U.S. Cl.
CPC ............ *B63H 20/32* (2013.01); *B63H 20/02* (2013.01); *F16B 9/02* (2013.01)

(58) Field of Classification Search
CPC ............ B63H 20/32; B63H 20/02; F16B 9/02
See application file for complete search history.

(56) References Cited

U.S. PATENT DOCUMENTS

| 11,433,982 | B2* | 9/2022 | Yamaguchi | B63H 20/12 |
| 2011/0244738 | A1* | 10/2011 | Daikoku | B63H 21/17 440/6 |
| 2013/0273792 | A1* | 10/2013 | Davis | B63H 20/32 440/75 |
| 2015/0050848 | A1* | 2/2015 | Nakamura | B63H 20/24 440/77 |
| 2017/0129577 | A1* | 5/2017 | Mizutani | B63H 20/06 |
| 2019/0185124 | A1* | 6/2019 | Tokuda | B63H 20/02 |
| 2020/0307753 | A1 | 10/2020 | Mizutani et al. | |

FOREIGN PATENT DOCUMENTS

JP 11-245892 A 9/1999
JP 2020-168889 A 10/2020

* cited by examiner

*Primary Examiner* — S. Joseph Morano
*Assistant Examiner* — Jovon E Hayes
(74) *Attorney, Agent, or Firm* — Keating & Bennett, LLP

(57) ABSTRACT

An outboard motor includes an outboard motor body including a propulsion generator and an engine to drive the propulsion generator, a pair of clamp brackets, a swivel bracket provided between the pair of clamp brackets and rotatable in an upward-downward direction with respect to the pair of clamp brackets while supporting the outboard motor body, and an electrical wiring extending from a position between the pair of clamp brackets upward to the outboard motor body through the swivel bracket and connected to the outboard motor body.

19 Claims, 6 Drawing Sheets

FIRST (SECOND) PREFERRED EMBODIMENT

SECOND PREFERRED EMBODIMENT

OUTBOARD MOTOR AND MARINE VESSEL

CROSS REFERENCE TO RELATED APPLICATIONS

This application claims the benefit of priority to Japanese Patent Application No. 2020-211783 filed on Dec. 21, 2020. The entire contents of this application are hereby incorporated herein by reference.

BACKGROUND OF THE INVENTION

1. Field of the Invention

The present invention relates to an outboard motor and a marine vessel each including an electrical wiring connected to an outboard motor body.

2. Description of the Related Art

An outboard motor and a marine vessel each including an electrical wiring connected to an outboard motor body are known in general. Such an outboard motor and a marine vessel are disclosed in Japanese Patent Laid-Open No. 11-245892, for example.

Japanese Patent Laid-Open No. 11-245892 discloses an outboard motor including an electrical wiring including a first end connected to the outboard motor body. The outboard motor includes a pair of clamp brackets attached to a hull and aligned in a right-left direction, and a swivel bracket that rotates in an upward-downward direction while supporting the outboard motor body. The outboard motor includes a hydraulic cylinder that rotates the swivel bracket and an electric motor that is a drive source for the hydraulic cylinder. The electric motor is provided between the pair of clamp brackets. A second end of the electrical wiring is connected to the electric motor.

One of the clamp brackets includes a through-hole that extends in a right-left direction. The electrical wiring is led out from a position sandwiched between the pair of clamp brackets to the outer lateral side (left or right side) of the pair of clamp brackets through the through-hole, and is connected from the outer lateral side of the pair of clamp brackets to the outboard motor body. That is, the electrical wiring is led out from the position sandwiched between the pair of clamp brackets to a position exposed to the outside through the through-hole. The electrical wiring includes a slack portion on the lateral side of the pair of clamp brackets to allow extension of the electrical wiring due to rotation of the swivel bracket.

In the outboard motor disclosed in Japanese Patent Laid-Open No. 11-245892, the electrical wiring is led out to the outer lateral side of the pair of clamp brackets from the position sandwiched between the pair of clamp brackets, and the slack portion of the electrical wiring is located on the outer lateral side of the pair of clamp brackets. Therefore, foreign matter on the water surface or in the water is likely to be caught in the slack portion of the electrical wiring, and improvement is desired. When foreign matter on the water surface or in the water is caught in the slack portion of the electrical wiring, the appearance is deteriorated, and it takes time and effort to remove the foreign matter.

SUMMARY OF THE INVENTION

Preferred embodiments of the present invention provide outboard motors and marine vessels that each significantly reduce or prevent catching of foreign matter from a water surface or in the water on an electrical wiring.

An outboard motor according to a preferred embodiment of the present invention includes an outboard motor body including a propulsion generator and an engine to drive the propulsion generator, a pair of clamp brackets to attach the outboard motor body to a hull, a swivel bracket provided between the pair of clamp brackets and rotatable in an upward-downward direction with respect to the pair of clamp brackets while supporting the outboard motor body, and an electrical wiring extending from a position between the pair of clamp brackets upward to the outboard motor body through the swivel bracket and connected to the outboard motor body.

An outboard motor according to a preferred embodiment of the present invention includes the electrical wiring that extends from the position between the pair of clamp brackets upward to the outboard motor body through the swivel bracket and is connected to the outboard motor body. Accordingly, the electrical wiring including the slack portion to allow extension of the electrical wiring due to rotation of the swivel bracket extends from the position between the pair of clamp brackets upward to the outboard motor body through the swivel bracket, and thus the electrical wiring is prevented from extending to the outer lateral sides of the pair of clamp brackets as occurs in conventional outboard motors. That is, the electrical wiring including the slack portion is connected to the outboard motor body through the position between the pair of clamp brackets. As a result, foreign matter on the water surface or in the water is unlikely to enter. Consequently, catching of foreign matter from the water surface or in the water on the electrical wiring is significantly reduced or prevented.

In an outboard motor according to a preferred embodiment of the present invention, the outboard motor body preferably includes a cowling to house the engine therein and including a lead-in port for the electrical wiring, and the electrical wiring preferably extends from the position between the pair of clamp brackets upward to the outboard motor body and preferably into the cowling via the lead-in port. Accordingly, the electrical wiring extends from the position between the pair of clamp brackets upward to the outboard motor body before the electrical wiring is led into the cowling via the lead-in port. Consequently, the electrical wiring is connected to the outboard motor body through a position that foreign matter on the water surface or in the water is unlikely to enter before the electrical wiring is led into the cowling via the lead-in port, and thus catching of foreign matter from the water surface or in the water on the electrical wiring before the electrical wiring is led into the cowling via the lead-in port is significantly reduced or prevented.

In an outboard motor according to a preferred embodiment of the present invention, the electrical wiring preferably extends through the swivel bracket from the position between the pair of clamp brackets and preferably extends upward to the outboard motor body. Accordingly, the electrical wiring is routed so as to extend through the swivel bracket, and thus the electrical wiring that extends upward between the pair of clamp brackets is connected to the outboard motor body without hindrance by the swivel bracket.

In such a case, the swivel bracket preferably includes an opening through which the electrical wiring extends, and the electrical wiring preferably extends through the opening of the swivel bracket from the position between the pair of clamp brackets and preferably extends upward to the outboard motor body. Accordingly, the opening of the swivel bracket allows the electrical wiring to easily extend through the swivel bracket.

An outboard motor including the swivel bracket that includes the opening through which the electrical wiring extends preferably further includes a rotation shaft, to which the swivel bracket is rotatably attached, at upper portions of the pair of clamp brackets, the swivel bracket preferably includes a hollow cylindrical portion coaxial with the rotation shaft, and the cylindrical portion preferably includes a lead-out port to lead the electrical wiring, which extends into the cylindrical portion through the opening, out to the outboard motor body. Accordingly, with the opening and the lead-out port, the electrical wiring extends to the outboard motor body through the inside of the cylindrical portion of the swivel bracket without being exposed to the outside. Consequently, catching of foreign matter from the water surface or in the water on the electrical wiring is effectively significantly reduced or prevented.

In an outboard motor in which the cylindrical portion of the swivel bracket includes the lead-out port to lead the electrical wiring, which extends into the cylindrical portion through the opening, out to the outboard motor body, the opening is preferably a through-hole to lead the electrical wiring into the cylindrical portion from the position between the pair of clamp brackets. Accordingly, the electrical wiring extends through the through-hole of the cylindrical portion of the swivel bracket such that movement of the electrical wiring toward the clamp brackets in the through-hole is restricted. Consequently, when the swivel bracket rotates in the upward-downward direction with respect to the clamp brackets, contact (interference) of the electrical wiring with the clamp brackets is significantly reduced or prevented.

In an outboard motor in which the cylindrical portion of the swivel bracket includes the lead-out port to lead the electrical wiring, which extends into the cylindrical portion through the opening, out to the outboard motor body, the swivel bracket preferably includes a swivel bracket body including the cylindrical portion, and a wiring restrictor attached to the swivel bracket body to restrict an orientation of the electrical wiring such that the electrical wiring extends toward the lead-out port. Accordingly, inside the cylindrical portion, the wiring restrictor restricts the orientation of the electrical wiring such that the electrical wiring extends toward the lead-out port. Consequently, as compared with a case in which the electrical wiring extends in a direction opposite to the lead-out port and then extends toward the lead-out port inside the cylindrical portion, the electrical wiring is efficiently and easily routed.

An outboard motor in which the electrical wiring extends through the swivel bracket from the position between the pair of clamp brackets and extends upward to the outboard motor body preferably further includes a rotator attached to the pair of clamp brackets at the position between the pair of clamp brackets to rotate the swivel bracket and the outboard motor body in the upward-downward direction, and the electrical wiring preferably includes a rotator wiring connected to the rotator. Accordingly, the rotator wiring extends from the position between the pair of clamp brackets upward to the outboard motor body through the swivel bracket, and thus catching of foreign matter from the water surface or in the water on the rotator wiring is significantly reduced or prevented.

In such a case, the outboard motor body preferably includes a cowling to house the engine therein, and a circuit housed in the cowling to switch a power supply of the rotator on and off, and the rotator wiring preferably connects the rotator to the circuit. Accordingly, catching of foreign matter from the water surface or in the water on the rotator wiring that connects the rotator to the circuit is significantly reduced or prevented.

In an outboard motor including the electrical wiring that includes the rotator wiring connected to the rotator, the rotator wiring preferably includes a slack portion provided at the position between the pair of clamp brackets to allow extension of the rotator wiring due to rotation of the swivel bracket by the rotator. Accordingly, the slack portion allows the extension of the rotator wiring due to the rotation of the swivel bracket by the rotator, and thus application of a load to the rotator wiring due to the rotation is significantly reduced or prevented.

In such a case, an outboard motor according to a preferred embodiment of the present invention preferably further includes a first wiring restrainer provided on one of the pair of clamp brackets or the rotator to restrain the rotator wiring, and a second wiring restrainer provided on the swivel bracket to restrain the rotator wiring, and the rotator wiring is preferably restrained by the first wiring restrainer and the second wiring restrainer such that the slack portion is located in a portion of the rotator wiring between the first wiring restrainer and the second wiring restrainer. Accordingly, the position of the slack portion in the rotator wiring is specified by the first wiring restrainer and the second wiring restrainer, and thus the slack portion is provided at a position at which it is unlikely to interfere with other structures.

An outboard motor including the first wiring restrainer and the second wiring restrainer preferably further includes a rotation shaft, to which the swivel bracket is rotatably attached, at upper portions of the pair of clamp brackets. The rotator preferably includes a cylinder to press against and rotate the swivel bracket, a pump to operate the cylinder by feeding a fluid to the cylinder, and an electric motor to drive the pump, and the first wiring restrainer preferably restrains the rotator wiring with respect to the electric motor at a position of the electric motor on a side of the rotation shaft. Accordingly, the first wiring restrainer restrains the rotator wiring on the side of the electric motor closer to the rotation shaft. Consequently, movement of the rotator wiring due to rotation of the swivel bracket about the rotation shaft is significantly reduced or prevented.

In an outboard motor including the first wiring restrainer to restrain the rotator wiring with respect to the electric motor at the position of the electric motor on a side of the rotation shaft, the second wiring restrainer preferably restrains the rotator wiring with respect to the swivel bracket in a vicinity of the rotation shaft and in a vicinity of the first wiring restrainer in a radial direction of the rotation shaft. Accordingly, the first wiring restrainer and the second wiring restrainer are located close to each other in the radial direction of the rotation shaft, and are located in the vicinity of the rotation shaft. Consequently, the slack portion between the first wiring restrainer and the second wiring restrainer is located in the vicinity of the rotation shaft, and thus the length of the slack portion is reduced as compared with a case in which the slack portion is located far away from the rotation shaft.

An outboard motor including the rotator wiring that includes the slack portion preferably further includes a tubular wiring storage provided at the position between the pair of clamp brackets to house the slack portion that is bent, and the outboard motor preferably allows extension of the rotator wiring by changing a length of the slack portion housed in the wiring storage when the swivel bracket is rotated. Accordingly, the slack portion is housed in the tubular wiring storage, and the extension of the rotator wiring is allowed inside the tubular wiring storage such that the slack portion is prevented from being entangled with other structures when the length of the slack portion is changed.

In such a case, the rotator preferably includes a cylinder to press against and rotate the swivel bracket, and the wiring storage is preferably provided at a position corresponding to the cylinder between the pair of clamp brackets. Accordingly, the wiring storage is provided in a space between the pair of clamp brackets corresponding to the cylinder.

An outboard motor in which the electrical wiring extends through the swivel bracket from the position between the pair of clamp brackets and extends upward to the outboard motor body preferably further includes a rotation angle sensor to detect a rotation angle of the swivel bracket, and the electrical wiring preferably includes a rotation angle sensor wiring connected to the rotation angle sensor. Accordingly, the rotation angle sensor wiring extends from the position between the pair of clamp brackets upward to the outboard motor body through the swivel bracket, and thus catching of foreign matter from the water surface or in the water on the rotation angle sensor wiring is significantly reduced or prevented.

An outboard motor according to a preferred embodiment of the present invention preferably further includes a steering mechanism to rotate the outboard motor body in a right-left direction in which the pair of clamp brackets are aligned, and the electrical wiring preferably includes a steering mechanism wiring connected to the steering mechanism. Accordingly, the steering mechanism wiring extends from the position between the pair of clamp brackets upward to the outboard motor body through the swivel bracket, and thus catching of foreign matter from the water surface or in the water on the steering mechanism wiring is significantly reduced or prevented.

In an outboard motor including the electrical wiring that includes the rotator wiring connected to the rotator, the outboard motor body preferably includes a cowling to house the engine therein and including a lead-in port for the electrical wiring, the electrical wiring preferably includes the rotator wiring and another electrical wiring connected to a device different from the rotator, and the rotator wiring and the another electrical wiring are preferably led into the cowling via the lead-in port that is common to the rotator wiring and the another electrical wiring. Accordingly, the rotator wiring and another electrical wiring are led into the cowling via the common lead-in port, and thus it is not necessary to provide a plurality of lead-in ports such that the device structure is simplified.

In an outboard motor according to a preferred embodiment of the present invention, the electrical wiring preferably includes a portion located outside the outboard motor body and located between the pair of clamp brackets in a right-left direction in which the pair of clamp brackets are aligned. Accordingly, the portion of the electrical wiring located outside the outboard motor body extends from the position between the pair of clamp brackets upward to the outboard motor body through the swivel bracket, and thus catching of foreign matter from the water surface or in the water on the portion of the electrical wiring located outside the outboard motor body is significantly reduced or prevented.

A marine vessel according to a preferred embodiment of the present invention includes a hull, and an outboard motor attached to the hull. The outboard motor includes an outboard motor body including a propulsion generator and an engine to drive the propulsion generator, a pair of clamp brackets to attach the outboard motor body to the hull, a swivel bracket provided between the pair of clamp brackets and rotatable in an upward-downward direction with respect to the pair of clamp brackets while supporting the outboard motor body, and an electrical wiring extending from a position between the pair of clamp brackets upward to the outboard motor body through the swivel bracket and connected to the outboard motor body.

A marine vessel according to a preferred embodiment of the present invention includes the electrical wiring extending from the position between the pair of clamp brackets upward to the outboard motor body through the swivel bracket and connected to the outboard motor body. Accordingly, the electrical wiring including the slack portion to allow extension of the electrical wiring due to rotation of the swivel bracket extends from the position between the pair of clamp brackets upward to the outboard motor body through the swivel bracket, and thus the electrical wiring is prevented from extending to the outer lateral sides of the pair of clamp brackets as in the conventional case. That is, the electrical wiring including the slack portion is connected to the outboard motor body through the position between the pair of clamp brackets that foreign matter on the water surface or in the water is unlikely to enter. Consequently, catching of foreign matter from the water surface or in the water on the electrical wiring is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 including an outboard motor 101 according to a first preferred embodiment of the present invention is now described with reference to FIGS. 1 to 9.

In the figures, arrow FWD represents the forward movement direction of the marine vessel 100 (front side with reference to a hull 100a), and arrow BWD represents the reverse movement direction of the marine vessel 100 (rear side with reference to the hull 100a). Furthermore, in the figures, arrow L represents the portside direction of the marine vessel 100 (portside direction with respect to the hull 100a), and arrow R represents the starboard direction of the marine vessel 100 (starboard direction with respect to the hull 100a). Moreover, in the figures, arrow Z1 represents the upper side of the marine vessel 100 (upper side with respect to the hull 100a), and arrow Z2 represents the lower side of the marine vessel 100 (lower side with respect to the hull 100a). In each figure, the central axis of a rotation shaft 20 that extends in a right-left direction is indicated by α.

Figure 1:
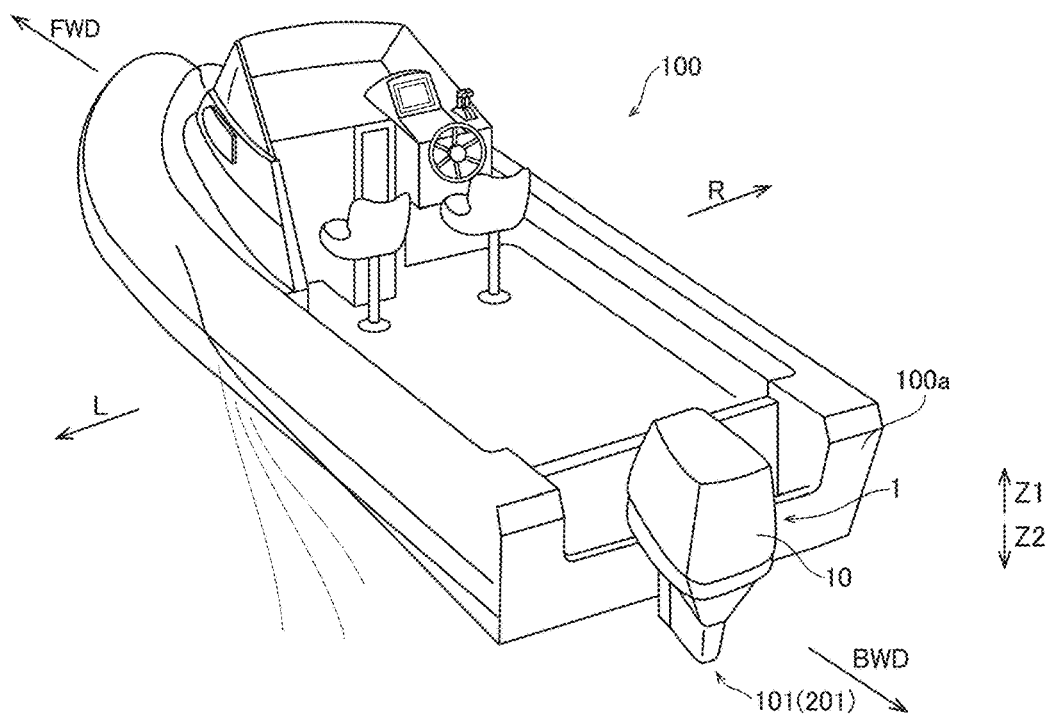
FIG. 1 is a perspective view schematically showing a marine vessel including an outboard motor according to first and second preferred embodiments of the present invention.

As shown in FIG. 1, the marine vessel 100 includes the hull 100a and the outboard motor 101.

The outboard motor 101 is attached to a transom of the hull 100a. That is, the marine vessel 100 is an outboard motor boat including the outboard motor 101.

Figure 2:
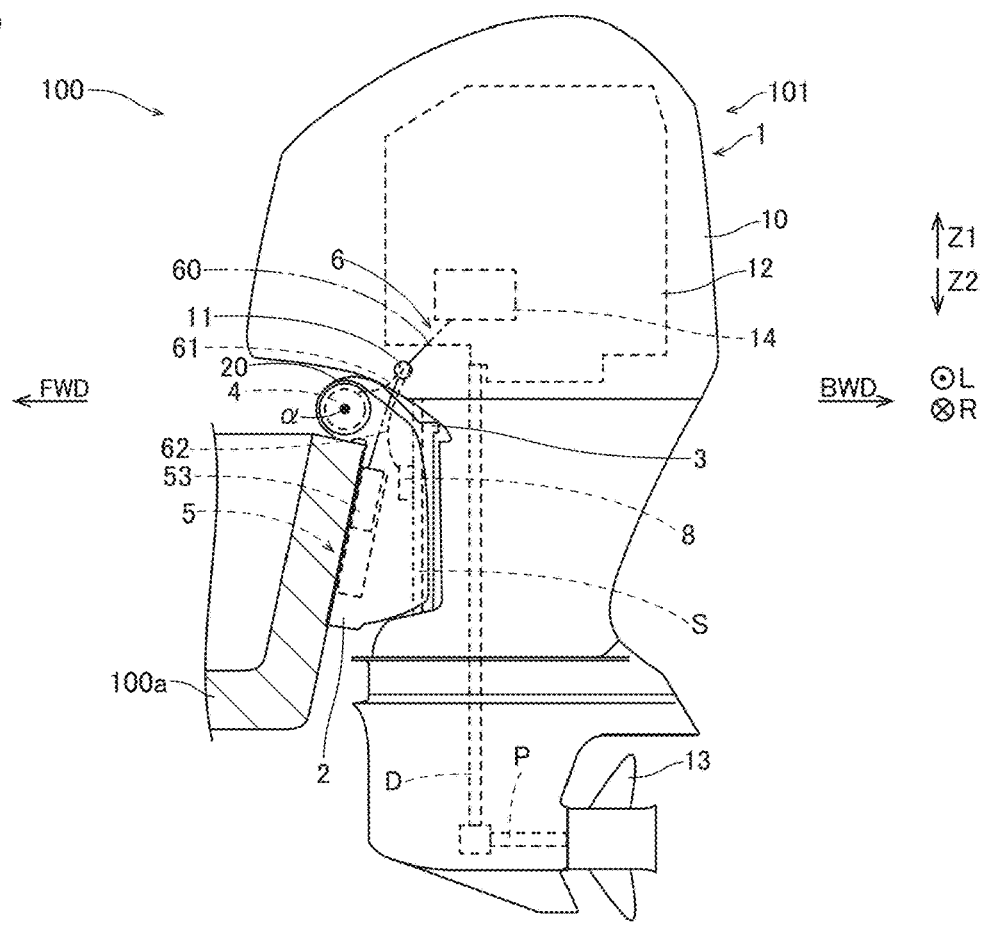
FIG. 2 is a side view illustrating the structure of the outboard motor according to the first preferred embodiment of the present invention.
Figure 3:
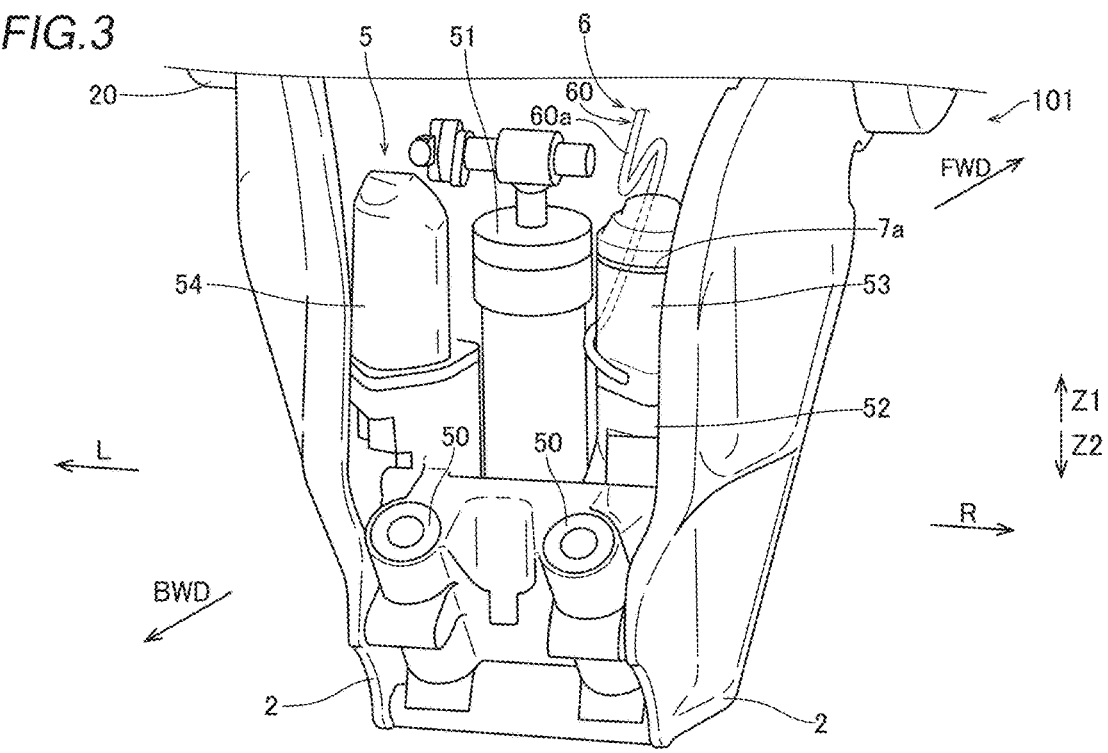
FIG. 3 is a perspective view showing clamp brackets and a rotating device of the outboard motor according to the first preferred embodiment of the present invention.

The outboard motor 101 shown in FIGS. 2 and 3 includes an outboard motor body 1, a pair of clamp brackets 2 to attach the outboard motor body 1 to the hull 100a, and a swivel bracket 3 to support the outboard motor body 1. The pair of clamp brackets 2 are aligned in the right-left direction while being attached to the hull 100a.

Figure 8:
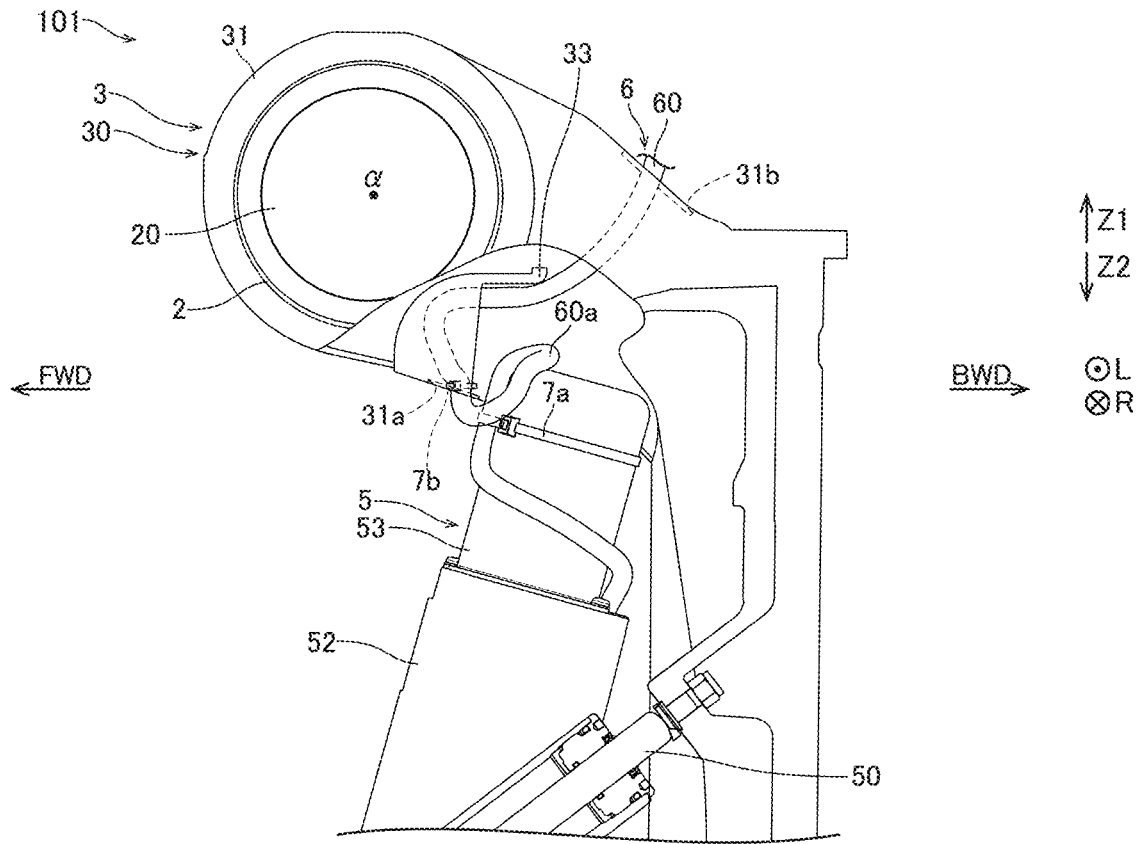
FIG. 8 is a side view showing the rotating device wiring, the wiring restrictor, a first wiring restrainer, and a second wiring restrainer of the outboard motor according to the first preferred embodiment of the present invention.

The outboard motor 101 includes a steering mechanism 4, a rotating device 5 (rotator), an electrical wiring 6 including a rotating device wiring 60, a steering mechanism wiring 61, and a rotation angle sensor wiring 62, a first wiring restrainer 7a (see FIG. 8), and a second wiring restrainer 7b (see FIG. 8). The rotation angle sensor wiring 62 is connected to a rotation angle sensor 8 described below. The steering mechanism 4 and the rotation angle sensor wiring 62 are examples of a "device different from the rotating device". The steering mechanism wiring 61 and the rotation angle sensor wiring 62 are examples of "another electrical wiring".

The first wiring restrainer 7a and the second wiring restrainer 7b fix the rotating device wiring 60 at a predetermined position.

Figure 4:
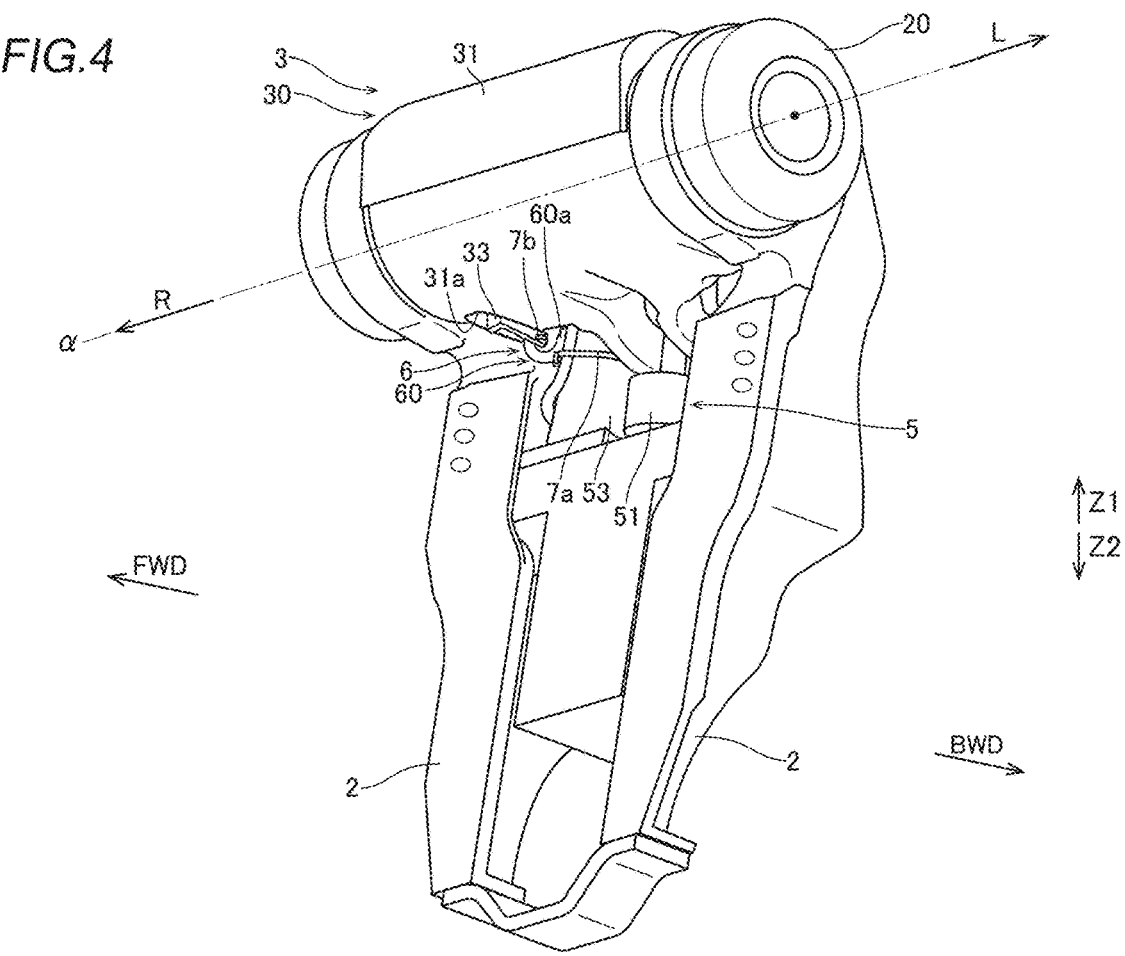
FIG. 4 is a perspective view showing the clamp brackets, a swivel bracket, and the rotating device of the outboard motor according to the first preferred embodiment of the present invention.

The electrical wiring 6 according to the first preferred embodiment shown in FIGS. 3 and 4 extends from a position sandwiched between the pair of clamp brackets 2 upward to the outboard motor body 1 through the swivel bracket 3 and is connected to the outboard motor body 1.

That is, in the right-left direction in which the pair of clamp brackets 2 are aligned, a portion of the electrical wiring 6 located outside the outboard motor body 1 is located between the pair of clamp brackets 2. That is, the electrical wiring 6 is not located in the starboard direction with respect to the clamp bracket 2 on the starboard side, and is not located in the portside direction with respect to the clamp bracket 2 on the port side. Therefore, the pair of clamp brackets 2 do not include through-holes and/or notches through which the electrical wiring 6 extends, for example.

The outboard motor body 1 shown in FIG. 2 includes a cowling 10, an engine 12, a propeller 13, and a circuit 14. The propeller 13 is an example of a "propulsion generator".

The cowling 10 is located in the uppermost portion of the outboard motor body 1. The engine 12, the circuit 14, etc. are housed in the cowling 10. The cowling 10 includes a lead-in port 11 for the electric wiring 6 to lead the electrical wiring 6 into the cowling 10. The rotating device wiring 60, the rotation angle sensor wiring 62, and the steering mechanism wiring 61 are led into the cowling 10 via the common (one) lead-in port 11.

The engine 12 is an internal combustion engine, for example, and generates a driving force by burning fuel and rotating a crankshaft (not shown). The engine 12 rotationally drives the propeller 13 by the generated driving force. The driving force is transmitted from the engine 12 to the propeller 13 via a drive shaft D and a propeller shaft P.

A first end of the rotating device wiring 60 is connected to the circuit 14. A second end of the rotating device wiring 60 is connected to an electric motor 53 of the rotating device 5. The circuit 14 switches a power supply of the rotating device 5 (electric motor 53) on and off. That is, the circuit 14 drives the rotating device 5.

The pair of clamp brackets 2 are spaced apart from each other in the right-left direction. The pair of clamp brackets 2 are directly attached to the hull 100a by a fixing member (such as a bolt) (not shown). The rotating device 5 is located between the pair of clamp brackets 2. The pair of clamp brackets 2 overlap the rotating device 5, as viewed in the right-left direction.

The rotation shaft 20, to which the swivel bracket 3 is rotatably attached, is provided at upper portions of the pair of clamp brackets 2. The rotation shaft 20 extends in the right-left direction and a horizontal direction. The rotation shaft 20 is the center of rotation of the swivel bracket 3 and the outboard motor body 1 that are rotated by the rotating device 5.

Figure 5:
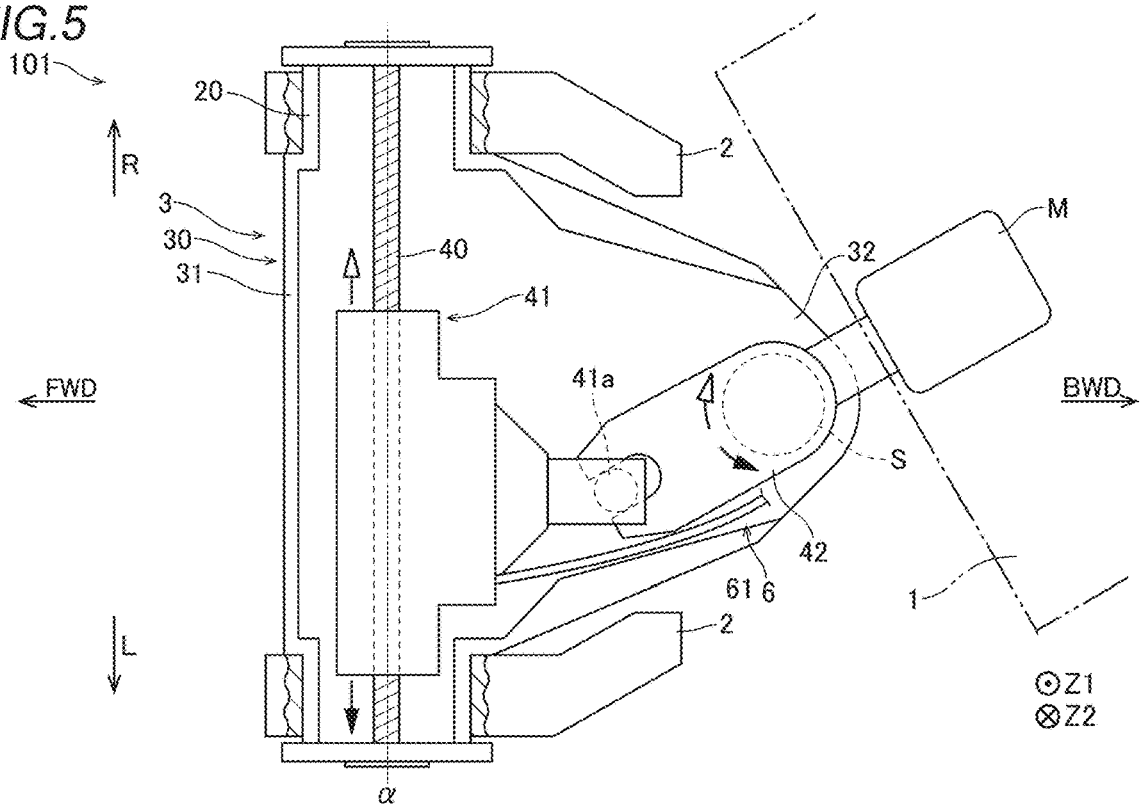
FIG. 5 is a plan view schematically showing a steering mechanism of the outboard motor according to the first preferred embodiment of the present invention.
Figure 6:
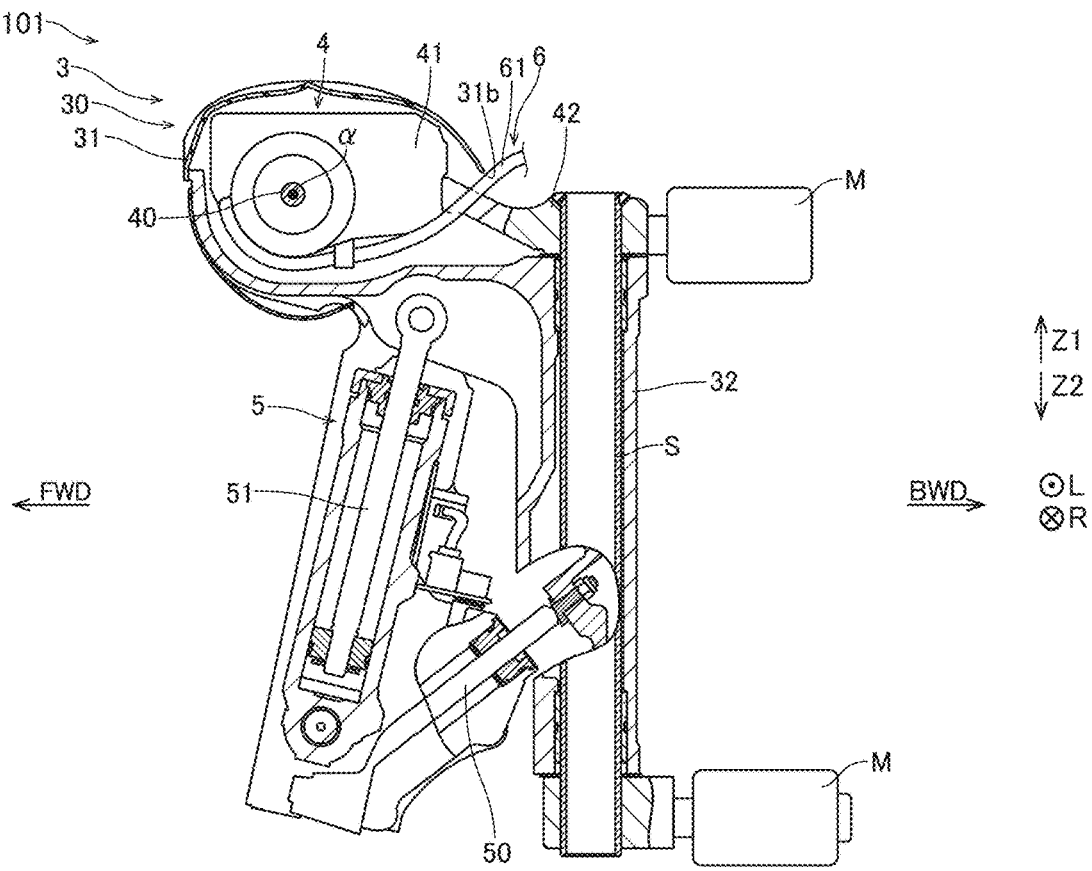
FIG. 6 is a side view of the steering mechanism and a steering mechanism wiring of the outboard motor according to the first preferred embodiment of the present invention.

A ball screw 40 of the steering mechanism 4 is coaxial with the central axis a of the rotation shaft 20 shown in FIGS. 5 and 6. The ball screw 40 extends in the right-left direction. A steering mechanism body 41 is threadedly engaged with the ball screw 40. That is, the steering mechanism body 41 is installed on the ball screw 40 so as to be movable along the rotation shaft 20.

Figure 7:
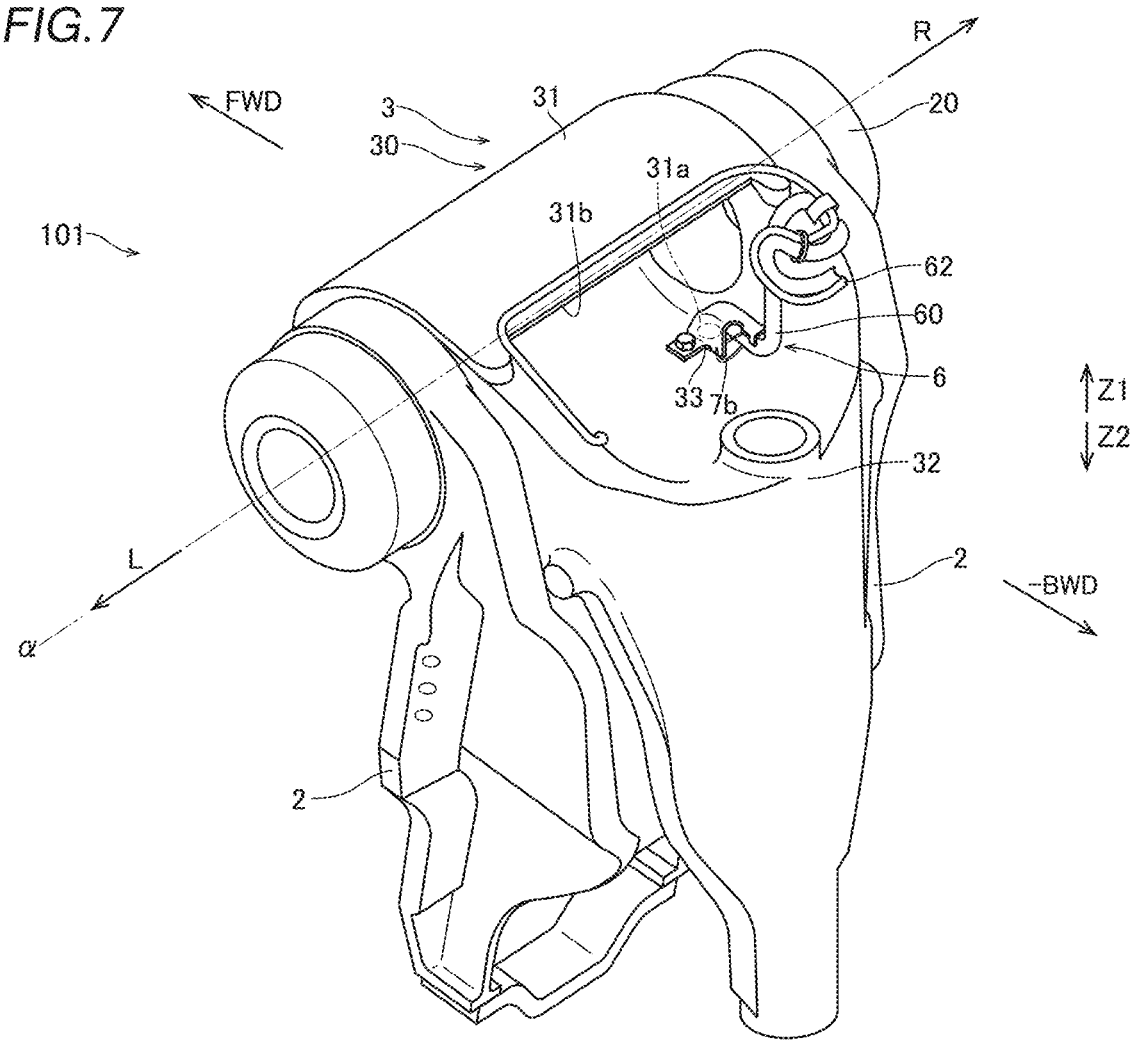
FIG. 7 is a perspective view showing a wiring restrictor and a rotating device wiring of the outboard motor according to the first preferred embodiment of the present invention.

The swivel bracket 3 shown in FIG. 7 is provided between the pair of clamp brackets 2 in the right-left direction, and is rotatable in an upward-downward direction with respect to the pair of clamp brackets 2 (rotation shaft 20). The swivel bracket 3 covers the electrical wiring 6 from the rear side such that the electrical wiring 6 is hardly visible from the outside during navigation in which a steering shaft S extends in the upward-downward direction.

The swivel bracket 3 includes a swivel bracket body 30 including a hollow cylindrical portion 31 coaxial with the rotation shaft 20 and a steering shaft support 32, and a wiring restrictor 33 attached to the swivel bracket body 30.

The steering mechanism 4 is housed in the cylindrical portion 31. The cylindrical portion 31 includes an opening 31a through which the rotating device wiring 60 (electrical wiring 6) extends, and a lead-out port 31b to lead the rotating device wiring 60, led into the cylindrical portion 31 through the opening 31a, out to the outboard motor body 1. The opening 31a is a through-hole to lead the rotating device wiring 60 into the cylindrical portion 31 from the position (the position on the electric motor 53 side) sandwiched between the pair of clamp brackets 2.

The steering shaft support 32 supports the steering shaft S, which is the center of rotation when the outboard motor body 1 rotates (steers) in the right-left direction. The steering shaft support 32 includes a cylindrical portion that covers the steering shaft S. Furthermore, a mount M on which the outboard motor body 1 is installed is provided on the steering shaft support 32.

Figure 9:
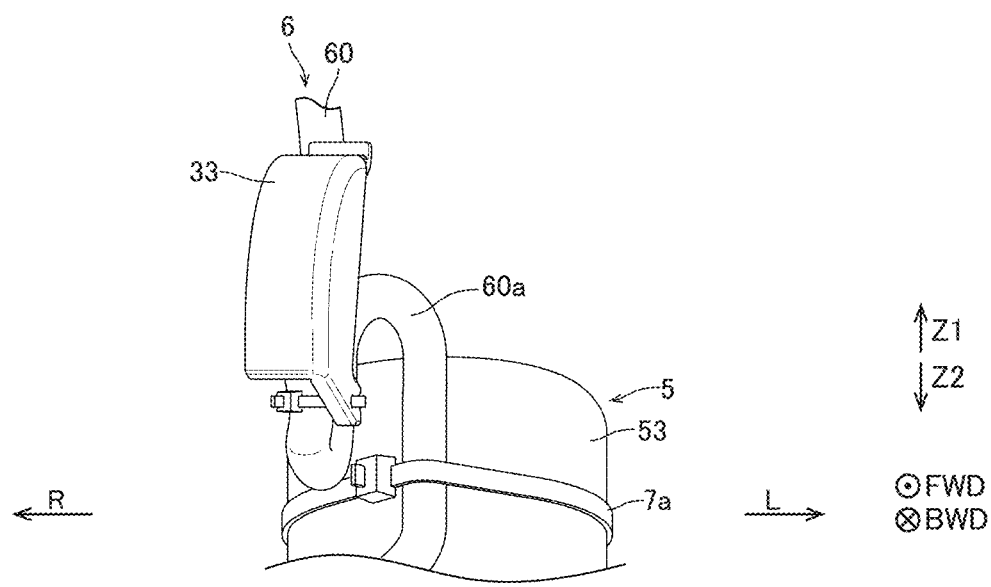
FIG. 9 is a diagram showing the rotating device wiring, the wiring restrictor, the first wiring restrainer, and the second wiring restrainer of the outboard motor according to the first preferred embodiment of the present invention, as viewed from the front side.

The wiring restrictor 33 shown in FIGS. 8 and 9 is provided inside the cylindrical portion 31. The wiring restrictor 33 restricts the orientation of the rotating device wiring 60 such that the rotating device wiring 60 that extends through the opening 31a toward the inside of the cylindrical portion 31 extends toward the lead-out port 31b.

The wiring restrictor 33 restricts the orientation of the rotating device wiring 60 by pressing the rotating device wiring 60 that extends through the opening 31a against one inner side surface of the cylindrical portion 31 in the right-left direction. The wiring regulator 33 includes an arcuate curved portion, and the rotating device wiring 60 is provided along the curved portion.

The second wiring restrainer 7b is attached to the wiring restrictor 33. That is, the rotating device wiring 60 is restrained to the wiring restrictor 33 by the second wiring restrainer 7b.

The steering mechanism 4 shown in FIGS. 5 and 6 rotates the outboard motor body 1 in the right-left direction in which the pair of clamp brackets 2 are aligned. The steering mechanism 4 includes the steering mechanism body 41 threadedly engaged with the ball screw 40 to move along the ball screw 40, and a steering shaft connector 42 connected to the steering shaft S.

The steering mechanism body 41 is provided inside the cylindrical portion 31. The steering mechanism body 41 includes an electric motor (not shown) that is a drive source to move the steering mechanism body 41 along the ball screw 40. The steering mechanism body 41 includes, at the rear, an engaging pin 41a that engages with the steering shaft connector 42. The steering mechanism body 41 drives (follows) the steering shaft connector 42 via the engaging pin 41a.

The steering shaft connector 42 engages with the engaging pin 41a of the steering mechanism body 41 at the front end of the steering shaft connector 42. The steering shaft connector 42 supports the steering shaft S at the rear end of the steering shaft connector 42. Furthermore, a mount M on which the outboard motor body 1 is installed is provided on the steering shaft connector 42.

When the steering mechanism body 41 moves along the ball screw 40, the front end of the steering shaft connector 42 is moved in the right-left direction by the steering mechanism body 41. Consequently, the steering shaft connector 42 rotates the steering shaft S connected to the rear end of the steering shaft connector 42. Thus, the outboard motor body 1 rotates in the right-left direction.

The rotating device 5 (power trim tilt device) shown in FIG. 3 is attached to the pair of clamp brackets 2 at the position sandwiched between the pair of clamp brackets 2. That is, the rotating device 5 is located between the pair of clamp brackets 2. Furthermore, the rotating device 5 is located below the rotation shaft 20 in the upward-downward direction. The rotating device 5 is directly attached to the pair of clamp brackets 2 by a fixing member (such as a bolt) (not shown). The rotating device 5 rotates the swivel bracket 3 (see FIG. 2) and the outboard motor body 1 (see FIG. 2) in the upward-downward direction.

The rotating device 5 includes two trim cylinders 50 to press against and rotate the swivel bracket 3, one tilt cylinder 51 to press against and rotate the swivel bracket 3, a pump 52, an electric motor 53, and a tank 54. The trim cylinders 50 and the tilt cylinder 51 are examples of a "cylinder".

The two trim cylinders 50 are parallel to each other with a space therebetween in the right-left direction. The two trim cylinders 50 are provided behind the tilt cylinder 51, the pump 52, the electric motor 53, and the tank 54. The rotating device 5 adjusts the orientation of the outboard motor body 1 (propeller 13 (see FIG. 2)) during navigation, for example, by expanding and contracting the trim cylinders 50.

One tilt cylinder 51 is provided between the two trim cylinders 50 in the right-left direction. Specifically, one tilt cylinder 51 is provided at a substantially intermediate position between the two trim cylinders 50 in the right-left direction. The rotating device 5 moves the outboard motor body 1 (propeller 13) out of the water by expanding the trim cylinders 50 and tilting the outboard motor body 1 up when the marine vessel 100 is stopped, for example.

The pump 52 is provided on a first side of the tilt cylinder 51 in the right-left direction. The pump 52 operates the trim cylinders 50 and the tilt cylinder 51 by feeding a fluid from the tank 54 to the trim cylinders 50 and the tilt cylinder 51. That is, the pump 52 expands and contracts the trim cylinders 50 and the tilt cylinder 51 to rotate the swivel bracket 3 and the outboard motor body 1 in the upward-downward direction. The tank 54 is provided on a second side of the tilt cylinder 51 in the right-left direction.

The electric motor 53 is installed on the pump 52 from above. The electric motor 53 drives the pump 52. Specifically, the electric motor 53 rotates an impeller (not shown) provided inside the pump 52. The first wiring restrainer 7a is attached to the electric motor 53. That is, the rotating device wiring 60 is restrained to the electric motor 53 by the first wiring restrainer 7a.

The electrical wiring 6 (the rotating device wiring 60, the steering mechanism wiring 61, and the rotation angle sensor wiring 62) shown in FIG. 2 extends from the position sandwiched between the pair of clamp brackets 2 upward to the outboard motor body 1 and is led into the cowling 10 via the lead-in port 11.

The electrical wiring 6 includes the rotating device wiring 60, the steering mechanism wiring 61, and the rotation angle sensor wiring 62.

A first end of the rotating device wiring 60 shown in FIG. 8 is connected to the circuit 14 of the outboard motor body 1, and a second end of the rotating device wiring 60 is connected to the electric motor 53 of the rotating device 5. That is, the rotating device wiring 60 electrically connects the circuit 14 to the rotating device 5.

The electric motor 53 is provided at the position sandwiched between the pair of clamp brackets 2. Therefore, the rotating device wiring 60 extends through the swivel bracket 3 from the position sandwiched between the pair of clamp brackets 2 and upward to the outboard motor body 1.

Specifically, the electrical wiring 6 extends through the opening 31a (through-hole) of the swivel bracket 3 from the position (the position on a side of the electric motor 53) sandwiched between the pair of clamp brackets 2 and extends upward to the outboard motor body 1.

The rotating device wiring 60 includes a slack portion 60a provided at the position sandwiched between the pair of clamp brackets 2 to allow extension of the rotating device wiring 60 due to rotation of the swivel bracket 3 in the upward-downward direction by the rotating device 5.

The slack portion 60a of the rotating device wiring 60 is a wiring portion between the first wiring restrainer 7a and the second wiring restrainer 7b. The first wiring restrainer 7a and the second wiring restrainer 7b are cable ties, for example. The first wiring restrainer 7a and the second wiring restrainer 7b may have any configuration other than the cable ties as long as the rotating device wiring 60 is restrained.

The first wiring restrainer 7a is provided on the electric motor 53 of the rotating device 5 to restrain the rotating device wiring 60. The first wiring restrainer 7a restrains the rotating device wiring 60 with respect to the electric motor 53 at a position of the electric motor 53 on a side of the rotation shaft 20 (the front side and upper side). Therefore, the first wiring restrainer 7a does not move as the swivel bracket 3 rotates in the upward-downward direction.

The second wiring restrainer 7b is provided on the wiring restrictor 33 of the swivel bracket 3 to restrain the rotating device wiring 60. Therefore, the second wiring restrainer 7b moves in the upward-downward direction together with the swivel bracket 3 as the swivel bracket 3 rotates in the upward-downward direction. The second wiring restrainer 7b restrains the rotating device wiring 60 with respect to the swivel bracket 3 in the vicinity of or adjacent to the rotation shaft 20 and in the vicinity of or adjacent to the first wiring restrainer 7a in the radial direction of the rotation shaft 20.

A first end of the steering mechanism wiring 61 shown in FIGS. 5 and 6 is connected to the outboard motor body 1, and a second end of the steering mechanism wiring 61 is connected to the steering mechanism 4. The steering mechanism wiring 61 supplies electric power to drive the steering mechanism 4. The steering mechanism wiring 61 is led out via the lead-out port 31b of the swivel bracket 3 to the outboard motor body 1.

A first end of the rotation angle sensor wiring 62 shown in FIG. 7 is connected to the outboard motor body 1, and a second end of the rotation angle sensor wiring 62 is connected to the rotation angle sensor 8 that detects the rotation angle of the swivel bracket 3 in the upward-downward direction. The rotation angle sensor wiring 62 is led out via the lead-out port 31b of the swivel bracket 3 to the outboard motor body 1. The rotation angle sensor 8 is installed on the swivel bracket 3 or one of the clamp brackets 2 (see FIG. 2).

According to the first preferred embodiment of the present invention, the following advantageous effects are achieved.

According to the first preferred embodiment of the present invention, the outboard motor 101 includes the electrical wiring 6 extending from the position sandwiched between the pair of clamp brackets 2 upward to the outboard motor body 1 through the swivel bracket 3 and connected to the outboard motor body 1. Accordingly, the electrical wiring 6 including the slack portion 60a to allow extension of the electrical wiring 6 due to rotation of the swivel bracket 3 extends from the position sandwiched between the pair of clamp brackets 2 upward to the outboard motor body 1 through the swivel bracket 3, and thus the electrical wiring 6 is prevented from extending out to the outer lateral sides of the pair of clamp brackets 2 as in the conventional case. That is, the electrical wiring 6 including the slack portion 60a is connected to the outboard motor body 1 through the position between the pair of clamp brackets 2 that foreign matter on the water surface or in the water is unlikely to enter. Consequently, catching of foreign matter from the water surface or in the water on the electrical wiring 6 is significantly reduced or prevented.

According to the first preferred embodiment of the present invention, the outboard motor body 1 includes the cowling 10 to house the engine 12 therein and including the lead-in port 11 for the electrical wiring 6, and the electrical wiring 6 extends from the position sandwiched between the pair of clamp brackets upward to the outboard motor body 1 and is led into the cowling 10 via the lead-in port 11. Accordingly, the electrical wiring 6 extends from the position sandwiched between the pair of clamp brackets 2 upward to the outboard motor body 1 before the electrical wiring 6 is led into the cowling 10 via the lead-in port 11. Consequently, the electrical wiring 6 is connected to the outboard motor body 1 through the position that foreign matter on the water surface or in the water is unlikely to enter before the electrical wiring 6 is led into the cowling 10 via the lead-in port 11, and thus catching of foreign matter from the water surface or in the water on the electrical wiring 6 before the electrical wiring 6 is led into the cowling 10 via the lead-in port 11 is significantly reduced or prevented.

According to the first preferred embodiment of the present invention, the electrical wiring 6 extends through the swivel bracket 3 from the position sandwiched between the pair of clamp brackets 2 and extends upward to the outboard motor body 1. Accordingly, the electrical wiring 6 is routed so as to extend through the swivel bracket 3, and thus the electrical wiring 6 that extends upward between the pair of clamp brackets 2 is connected to the outboard motor body 1 without hindrance by the swivel bracket 3.

According to the first preferred embodiment of the present invention, the swivel bracket 3 includes the opening 31a through which the electrical wiring 6 extends, and the electrical wiring 6 extends through the opening 31a of the swivel bracket 3 from the position sandwiched between the pair of clamp brackets 2 and extends upward to the outboard motor body 1. Accordingly, the opening 31a of the swivel bracket 3 allows the electrical wiring 6 to easily extend through the swivel bracket 3.

According to the first preferred embodiment of the present invention, the outboard motor 101 includes, at the upper portions of the pair of clamp brackets 2, the rotation shaft 20 to which the swivel bracket 3 is rotatably attached, the swivel bracket 3 includes the hollow cylindrical portion 31 coaxial with the rotation shaft, and the cylindrical portion 31 includes the lead-out port 31b to lead the electrical wiring 6, led into the cylindrical portion 31 through the opening 31a, out to the outboard motor body 1. Accordingly, with the opening 31a and the lead-out port 31b, the electrical wiring 6 is led out to the outboard motor body 1 through the inside of the cylindrical portion 31 of the swivel bracket 3 without being exposed to the outside. Consequently, catching of foreign matter from the water surface or in the water on the electrical wiring 6 is effectively significantly reduced or prevented.

According to the first preferred embodiment of the present invention, the opening 31a is a through-hole to lead the electrical wiring 6 into the cylindrical portion 31 from the position sandwiched between the pair of clamp brackets 2. Accordingly, the electrical wiring 6 extends through the through-hole of the cylindrical portion 31 of the swivel bracket 3 such that movement of the electrical wiring 6 toward the clamp brackets 2 in the through-hole is restricted. Consequently, when the swivel bracket 3 rotates in the upward-downward direction with respect to the clamp brackets 2, contact (interference) of the electrical wiring 6 with the clamp brackets 2 is significantly reduced or prevented.

According to the first preferred embodiment of the present invention, the swivel bracket 3 includes the swivel bracket body 30 including the cylindrical portion 31, and the wiring restrictor 33 attached to the swivel bracket body 30 to restrict the orientation of the electrical wiring 6 such that the electrical wiring 6 extends toward the lead-out port 31b. Accordingly, inside the cylindrical portion 31, the wiring restrictor 33 restricts the orientation of the electrical wiring 6 such that the electrical wiring 6 extends toward the lead-out port 31b. Consequently, as compared with a case in which the electrical wiring 6 extends in a direction opposite to the lead-out port 31b and then extends toward the lead-out port 31b inside the cylindrical portion 31, the electrical wiring 6 is efficiently and easily routed.

According to the first preferred embodiment of the present invention, the outboard motor 101 further includes the rotating device 5 attached to the pair of clamp brackets 2 at the position sandwiched between the pair of clamp brackets 2 to rotate the swivel bracket 3 and the outboard motor body 1 in the upward-downward direction, and the electrical wiring 6 includes the rotating device wiring 60 connected to the rotating device 5. Accordingly, the rotating device wiring 60 extends from the position sandwiched between the pair of clamp brackets 2 upward to the outboard motor body 1 through the swivel bracket 3, and thus catching of foreign matter from the water surface or in the water on the rotating device wiring 60 is significantly reduced or prevented.

According to the first preferred embodiment of the present invention, the outboard motor body 1 includes the cowling 10 to house the engine 12 therein, and the circuit 14 housed in the cowling 10 to switch the power supply of the rotating device 5 on and off, and the rotating device wiring 60 connects the rotating device 5 to the circuit 14. Accordingly, catching of foreign matter from the water surface or in the water on the rotating device wiring 60 that connects the rotating device 5 to the circuit 14 is significantly reduced or prevented.

According to the first preferred embodiment of the present invention, the rotating device wiring 60 includes the slack portion 60a provided at the position sandwiched between the pair of clamp brackets 2 to allow extension of the rotating device wiring 60 due to rotation of the swivel bracket 3 by the rotating device 5. Accordingly, the slack portion 60a allows the extension of the rotating device wiring 60 due to the rotation of the swivel bracket 3 by the rotating device 5, and thus application of a load to the rotating device wiring 60 due to the rotation is significantly reduced or prevented.

According to the first preferred embodiment of the present invention, the outboard motor 101 further includes the first wiring restrainer 7a provided on the clamp brackets 2 or the rotating device 5 to restrain the rotating device wiring 60, and the second wiring restrainer 7b provided on the swivel bracket 3 to restrain the rotating device wiring 60, and the rotating device wiring 60 is restrained by the first wiring restrainer 7a and the second wiring restrainer 7b such that the slack portion 60a is located in a portion of the rotating device wiring 60 between the first wiring restrainer 7a and the second wiring restrainer 7b. Accordingly, the position of the slack portion 60a in the rotating device wiring 60 is specified by the first wiring restrainer 7a and the second wiring restrainer 7b, and thus the slack portion 60a is provided at a position at which it is unlikely to interfere with other structures.

According to the first preferred embodiment of the present invention, the outboard motor 101 further includes, at the upper portions of the pair of clamp brackets 2, the rotation shaft 20 to which the swivel bracket 3 is rotatably attached, and the rotating device 5 includes the trim cylinder 50 and the tilt cylinder 51 to press against and rotate the swivel bracket 3, the pump 52 to operate the trim cylinder 50 and the tilt cylinder 51 by feeding a fluid to the trim cylinder 50 and the tilt cylinder 51, and the electric motor 53 to drive the pump 52. Furthermore, the first wiring restrainer 7a restrains the rotating device wiring 60 with respect to the electric motor 53 at the position of the electric motor 53 on the rotation shaft 20 side. Accordingly, the first wiring restrainer 7a restrains the rotating device wiring 60 on the side of the electric motor 53 closer to the rotation shaft 20. Consequently, movement of the rotating device wiring 60 due to rotation of the swivel bracket 3 about the rotation shaft 20 is significantly reduced or prevented.

According to the first preferred embodiment of the present invention, the second wiring restrainer 7b restrains the rotating device wiring 60 with respect to the swivel bracket 3 in the vicinity of or adjacent to the rotation shaft 20 and in the vicinity of or adjacent to the first wiring restrainer 7a in the radial direction of the rotation shaft 20. Accordingly, the first wiring restrainer 7a and the second wiring restrainer 7b are located close to each other in the radial direction of the rotation shaft 20, and are located in the vicinity of or adjacent to the rotation shaft 20. Consequently, the slack portion 60a between the first wiring restrainer 7a and the second wiring restrainer 7b is located in the vicinity of or adjacent to the rotation shaft 20, and thus the length of the slack portion 60a is reduced as compared with a case in which the slack portion 60a is located far away from the rotation shaft 20.

According to the first preferred embodiment of the present invention, the outboard motor 101 further includes the rotation angle sensor 8 to detect the rotation angle of the swivel bracket 3, and the electrical wiring 6 includes the rotation angle sensor wiring 62 connected to the rotation angle sensor 8. Accordingly, the rotation angle sensor wiring 62 extends from the position sandwiched between the pair of clamp brackets 2 upward to the outboard motor body 1 through the swivel bracket 3, and thus catching of foreign matter from the water surface or in the water on the rotation angle sensor wiring 62 is significantly reduced or prevented.

According to the first preferred embodiment of the present invention, the outboard motor 101 further includes the steering mechanism 4 to rotate the outboard motor body 1 in the right-left direction in which the pair of clamp brackets 2 are aligned, and the electrical wiring 6 includes the steering mechanism wiring 61 connected to the steering mechanism 4. Accordingly, the steering mechanism wiring 61 extends from the position sandwiched between the pair of clamp brackets 2 upward to the outboard motor body 1 through the swivel bracket 3, and thus catching of foreign matter from the water surface or in the water on the steering mechanism wiring 61 is significantly reduced or prevented.

According to the first preferred embodiment of the present invention, the outboard motor body 1 includes the cowling 10 to house the engine 12 therein and including the lead-in port 11 for the electrical wiring 6. Furthermore, the electrical wiring 6 includes the rotating device wiring 60 and another electrical wiring 6 (the steering mechanism wiring 61 or the rotation angle sensor wiring 62) connected to the device (the steering mechanism 4 or the rotation angle sensor 8) different from the rotating device 5, and the rotating device wiring 60 and another electrical wiring 6 are led into the cowling 10 via the common lead-in port 11. Accordingly, the rotating device wiring 60 and another electrical wiring 6 are led into the cowling 10 via the common lead-in port 11, and thus it is not necessary to provide a plurality of lead-in ports 11 such that the device structure is simplified.

According to the first preferred embodiment of the present invention, the portion of the electrical wiring 6 located outside the outboard motor body 1 is located between the pair of clamp brackets 2 in the right-left direction in which the pair of clamp brackets 2 are aligned. Accordingly, the portion of the electrical wiring 6 located outside the outboard motor body 1 extends from the position sandwiched between the pair of clamp brackets 2 upward to the outboard motor body 1 through the swivel bracket 3, and thus catching of foreign matter from the water surface or in the water on the portion of the electrical wiring 6 located outside the outboard motor body 1 is significantly reduced or prevented.

Second Preferred Embodiment

A second preferred embodiment of the present invention is now described with reference to FIGS. 1, 10, and 11. In the second preferred embodiment, an outboard motor 201 includes a wiring storage 202, unlike the first preferred embodiment in which the outboard motor 101 includes the first wiring restrainer 7a and the second wiring restrainer 7b. In the figures, the same or similar structures as those of the first preferred embodiment are denoted by the same reference numerals.

Figure 10:
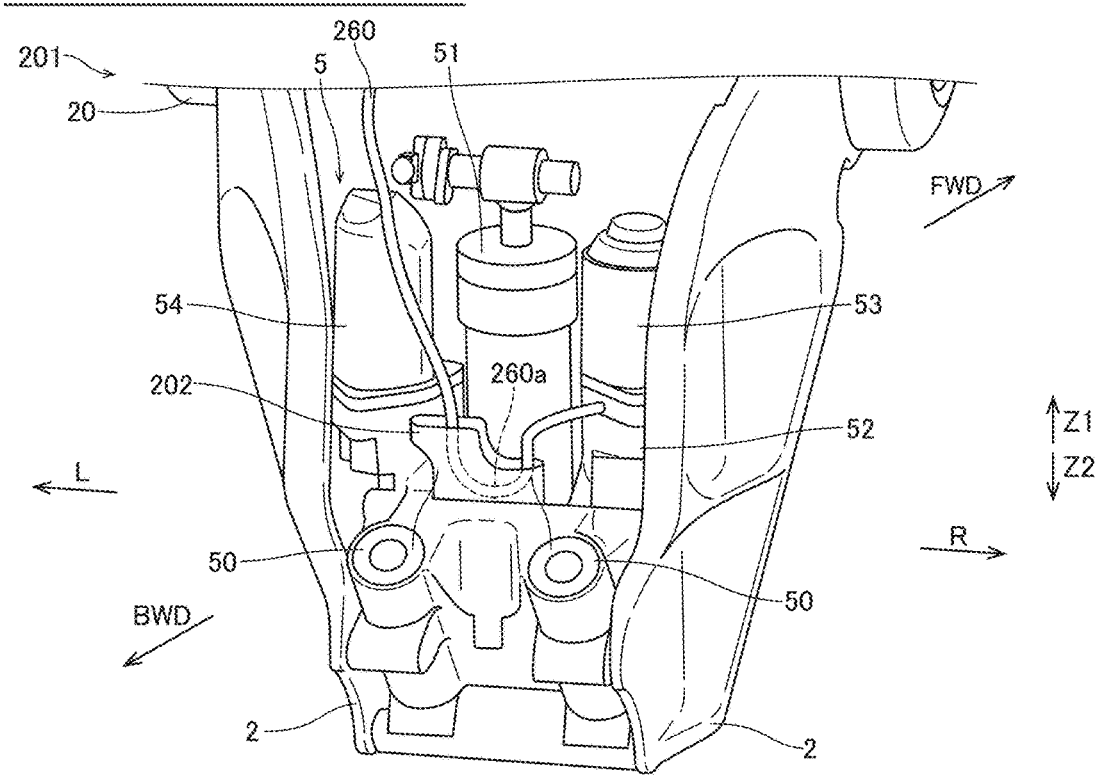
FIG. 10 is a perspective view showing a wiring storage, clamp brackets, and a rotating device of the outboard motor according to the second preferred embodiment of the present invention.
Figure 11:
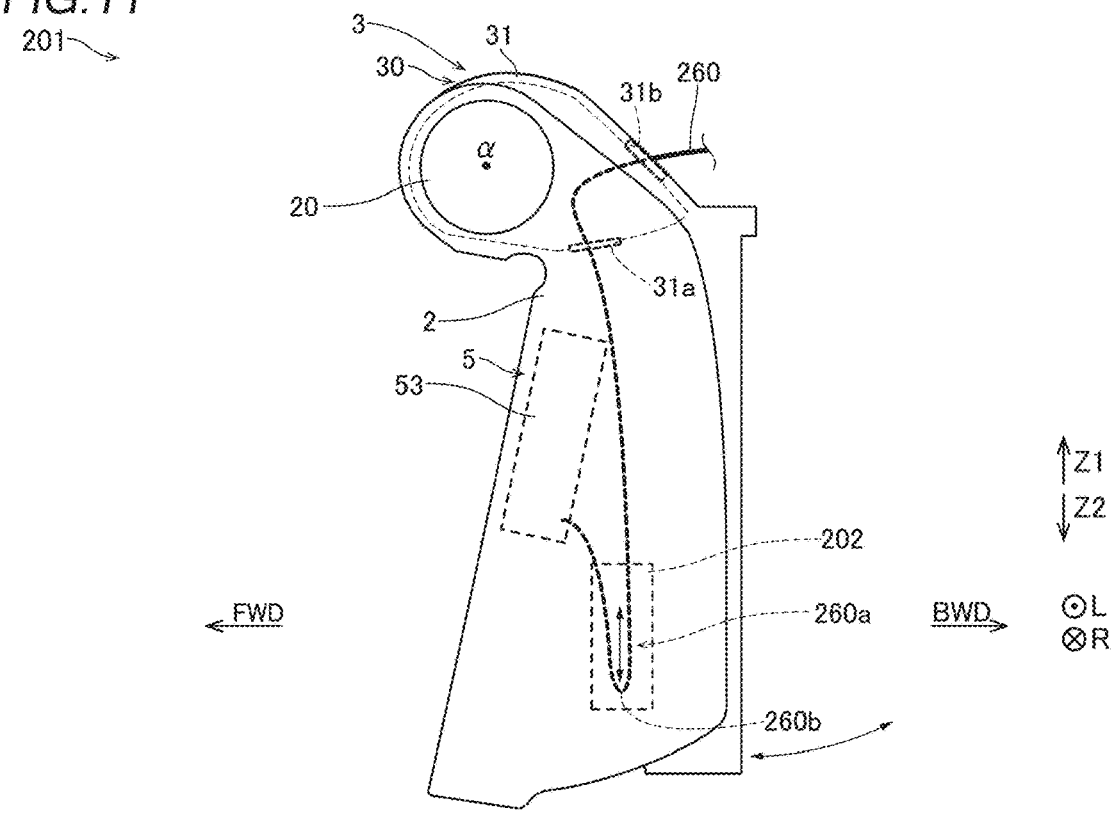
FIG. 11 is a perspective view schematically showing the wiring storage, the clamp brackets, a swivel bracket, and the rotating device of the outboard motor according to the second preferred embodiment of the present invention.

An outboard motor 201 according to the second preferred embodiment shown in FIGS. 10 and 11 includes a tubular wiring storage 202 to house a slack portion 260a that is a bent portion of a rotating device wiring 260.

The rotating device wiring 260 extends from a position sandwiched between a pair of clamp brackets 2 upward to an outboard motor body 1 (see FIG. 1) through a swivel bracket 3, and is connected to the outboard motor body 1.

The wiring storage 202 is installed (fixed) on a rotating device 5 (power trim tilt device). The wiring storage 202 is provided at the position sandwiched between the pair of clamp brackets 2. The wiring storage 202 is provided at a position corresponding to a tilt cylinder 51 between the pair of clamp brackets 2.

Specifically, the wiring storage 202 is provided at a position rearward of the tilt cylinder 51 and adjacent to the tilt cylinder 51. Furthermore, the wiring storage 202 is located below an electric motor 53.

The wiring storage 202 includes a through-hole that penetrates in an upward-downward direction. The wiring storage 202 may have a cup shape, for example, having a bottom surface.

The outboard motor 201 allows extension of the rotating device wiring 260 by changing the length of the slack portion 260a housed in the wiring storage 202 when the swivel bracket 3 is rotated in the upward-downward direction. That is, in the outboard motor 201, a bent portion (bent portion 260b) of the rotating device wiring 260 moves up and down inside the wiring storage 202 as the swivel bracket 3 rotates in the upward-downward direction.

The remaining structures of the second preferred embodiment are similar to those of the first preferred embodiment.

According to the second preferred embodiment of the present invention, the following advantageous effects are achieved.

According to the second preferred embodiment of the present invention, the outboard motor 201 includes an electrical wiring 6 extending from the position sandwiched between the pair of clamp brackets 2 upward to the outboard motor body 1 through the swivel bracket 3 and connected to the outboard motor body 1. Accordingly, similarly to the first preferred embodiment, catching of foreign matter from the water surface or in the water on the electrical wiring 6 is significantly reduced or prevented.

According to the second preferred embodiment of the present invention, the outboard motor 202 further includes the tubular wiring storage 202 provided at the position sandwiched between the pair of clamp brackets 2 to house the slack portion 260a that is bent, and allows extension of the rotating device wiring 260 by changing the length of the slack portion 260a housed in the wiring storage 202 when the swivel bracket 3 is rotated. Accordingly, the slack portion 260a is housed in the tubular wiring storage 202, and the extension of the rotating device wiring 260 is allowed inside the tubular wiring storage 202 such that the slack portion 260a is prevented from being entangled with other structures when the length of the slack portion 260a is changed.

According to the second preferred embodiment of the present invention, the rotating device 5 includes the tilt cylinder 51 to press against and rotate the swivel bracket 3, and the wiring storage 202 is provided at the position corresponding to the tilt cylinder 51 between the pair of clamp brackets 2. Accordingly, the wiring storage 202 is provided in a space between the pair of clamp brackets 2 corresponding to the tilt cylinder 51.

The remaining advantageous effects of the second preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the opening of the swivel bracket is preferably a through-hole in each of the first and second preferred embodiments described above, the present invention is not restricted to this. In the present invention, the opening of the swivel bracket may alternatively have a configuration other than a through-hole such as a notch.

While the marine vessel preferably includes one outboard motor in each of the first and second preferred embodiments described above, the present invention is not restricted to this. In the present invention, the marine vessel may alternatively include a plurality of outboard motors.

While the electrical wiring preferably includes the rotating device wiring, the rotation angle sensor wiring, and the steering mechanism wiring in each of the first and second preferred embodiments described above, the present invention is not restricted to this. The electrical wiring may alternatively include an electrical wiring other than the rotating device wiring, the rotation angle sensor wiring, and the steering mechanism wiring such as a wiring for an electrical component of the outboard motor.

While the steering mechanism is preferably located inside the cylindrical portion of the swivel bracket in each of the first and second preferred embodiments described above, the present invention is not restricted to this. In the present invention, the steering mechanism may alternatively be located outside the cylindrical portion of the swivel bracket.

While the rotating device preferably includes the tank in each of the first and second preferred embodiments described above, the present invention is not restricted to this. In the present invention, the rotating device may not include the tank.

While the two trim cylinders are preferably provided in each of the first and second preferred embodiments described above, the present invention is not restricted to this. In the present invention, only one trim cylinder or three or more trim cylinders may alternatively be provided.

While the devices mounted on the outboard motor and the outboard motor body are preferably connected to each other by the electrical wiring in each of the first and second preferred embodiments described above, the present invention is not restricted to this. In the present invention, devices mounted on the hull and the outboard motor body may alternatively be connected to each other by the electrical wiring.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an outboard motor body including a propulsion generator and an engine to drive the propulsion generator;
    a pair of clamp brackets to attach the outboard motor body to a hull;
    a swivel bracket provided between the pair of clamp brackets and rotatable in an upward-downward direction with respect to the pair of clamp brackets while supporting the outboard motor body; and
    an electrical wiring extending from a position between the pair of clamp brackets upward to the outboard motor body through the swivel bracket and connected to the outboard motor body; wherein
    a first end of the electrical wiring is arranged at an inside of the outboard motor body, and a second end of the electrical wiring is arranged at a position between the pair of clamp brackets.

2. The outboard motor according to claim 1, wherein
    the outboard motor body includes a cowling to house the engine therein and including a lead-in port for the electrical wiring; and
    the electrical wiring extends from the position between the pair of clamp brackets upward to the outboard motor body and into the cowling via the lead-in port.

3. The outboard motor according to claim 1, wherein the electrical wiring extends through the swivel bracket from the position between the pair of clamp brackets and upward to the outboard motor body.

4. The outboard motor according to claim 3, wherein
    the swivel bracket includes an opening through which the electrical wiring extends; and
    the electrical wiring extends through the opening of the swivel bracket from the position between the pair of clamp brackets and upward to the outboard motor body.

5. The outboard motor according to claim 4, further comprising:
    a rotation shaft, to which the swivel bracket is rotatably attached, provided at upper portions of the pair of clamp brackets; wherein
    the swivel bracket includes a hollow cylindrical portion coaxial with the rotation shaft; and
    the cylindrical portion includes a lead-out port to lead the electrical wiring, which extends into the cylindrical portion through the opening, out to the outboard motor body.

6. The outboard motor according to claim 5, wherein the opening is a through-hole to lead the electrical wiring into the cylindrical portion from the position between the pair of clamp brackets.

7. The outboard motor according to claim 5, wherein the swivel bracket includes:
    a swivel bracket body including the cylindrical portion; and
    a wiring restrictor attached to the swivel bracket body to restrict an orientation of the electrical wiring such that the electrical wiring extends toward the lead-out port.

8. The outboard motor according to claim 3, further comprising:
    a rotator attached to the pair of clamp brackets at the position between the pair of clamp brackets to rotate the swivel bracket and the outboard motor body in the upward-downward direction; wherein
    the electrical wiring includes a rotator wiring connected to the rotator.

9. The outboard motor according to claim 8, wherein the outboard motor body includes:
    a cowling to house the engine therein; and
    a circuit housed in the cowling to switch a power supply of the rotator on and off; and
    the rotator wiring connects the rotator to the circuit.

10. The outboard motor according to claim 8, wherein the rotator wiring includes a slack portion provided at the position between the pair of clamp brackets to allow extension of the rotator wiring due to rotation of the swivel bracket by the rotator.

11. The outboard motor according to claim 10, further comprising:
    a first wiring restrainer provided on one of the pair of clamp brackets or the rotator to restrain the rotator wiring; and
    a second wiring restrainer provided on the swivel bracket to restrain the rotator wiring; wherein
    the rotator wiring is restrained by the first wiring restrainer and the second wiring restrainer such that the slack portion is located in a portion of the rotator wiring between the first wiring restrainer and the second wiring restrainer.

12. The outboard motor according to claim 11, further comprising:
    a rotation shaft, to which the swivel bracket is rotatably attached, at upper portions of the pair of clamp brackets; wherein
    the rotator includes:
        a cylinder to press against and rotate the swivel bracket;
        a pump to operate the cylinder by feeding a fluid to the cylinder; and
        an electric motor to drive the pump; and
    the first wiring restrainer restrains the rotator wiring with respect to the electric motor at a position of the electric motor on a side of the rotation shaft.

13. The outboard motor according to claim 12, wherein the second wiring restrainer restrains the rotator wiring with respect to the swivel bracket in a vicinity of the rotation shaft and in a vicinity of the first wiring restrainer in a radial direction of the rotation shaft.

14. The outboard motor according to claim 10, further comprising:
a tubular wiring storage provided at the position between the pair of clamp brackets to house the slack portion that is bent; wherein
the outboard motor allows extension of the rotator wiring by changing a length of the slack portion housed in the wiring storage when the swivel bracket is rotated.

15. The outboard motor according to claim 14, wherein
the rotator includes a cylinder to press against and rotate the swivel bracket; and
the wiring storage is provided at a position corresponding to the cylinder between the pair of clamp brackets.

16. The outboard motor according to claim 3, further comprising:
a rotation angle sensor to detect a rotation angle of the swivel bracket; wherein
the electrical wiring includes a rotation angle sensor wiring connected to the rotation angle sensor.

17. The outboard motor according to claim 1, further comprising:
a steering mechanism to rotate the outboard motor body in a right-left direction in which the pair of clamp brackets are aligned; wherein
the electrical wiring includes a steering mechanism wiring connected to the steering mechanism.

18. The outboard motor according to claim 8, wherein
the outboard motor body includes a cowling to house the engine therein and including a lead-in port for the electrical wiring;
the electrical wiring includes the rotator wiring and another electrical wiring connected to a device different from the rotator; and
the rotator wiring and the another electrical wiring extend into the cowling via the lead-in port.

19. A marine vessel comprising:
a hull; and
an outboard motor attached to the hull; wherein
the outboard motor includes:
an outboard motor body including a propulsion generator and an engine to drive the propulsion generator;
a pair of clamp brackets to attach the outboard motor body to the hull;
a swivel bracket provided between the pair of clamp brackets and rotatable in an upward-downward direction with respect to the pair of clamp brackets while supporting the outboard motor body; and
an electrical wiring extending from a position between the pair of clamp brackets upward to the outboard motor body through the swivel bracket and connected to the outboard motor body; wherein
a first end of the electrical wiring is arranged at an inside of the outboard motor body, and a second end of the electrical wiring is arranged at a position between the pair of clamp brackets.

* * * * *